United States Patent
Wickboldt et al.

(10) Patent No.: US 12,495,984 B2
(45) Date of Patent: Dec. 16, 2025

(54) BLOOD PRESSURE MONITORING UTILIZING PRESSURE WAVE VELOCITY AND CALIBRATION CORRECTION WITH NEAR INFRARED IMAGING

(71) Applicant: OmniVision Technologies, Inc., Santa Clara, CA (US)

(72) Inventors: Paul Wickboldt, Walnut Creek, CA (US); Andreas Suess, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 451 days.

(21) Appl. No.: 18/076,740

(22) Filed: Dec. 7, 2022

(65) Prior Publication Data

US 2024/0188841 A1 Jun. 13, 2024

(51) Int. Cl.
*A61B 5/00* (2006.01)
*A61B 5/021* (2006.01)
*A61B 5/0295* (2006.01)

(52) U.S. Cl.
CPC .......... *A61B 5/0295* (2013.01); *A61B 5/0031* (2013.01); *A61B 5/02125* (2013.01)

(58) Field of Classification Search
CPC . A61B 5/0295; A61B 5/0031; A61B 5/02125; A61B 5/0077; A61B 5/02141; A61B 2562/04; A61B 5/004; A61B 5/0059; A61B 5/72; A61B 5/7267; A61B 2560/0223
See application file for complete search history.

(56) References Cited

PUBLICATIONS

Arakawa, M. et al. "Blood pressure measurement using piezoelectric effect by an ultrasonic probe". Sensors and Actuators A 286, 2019, pp. 146-151.
Bashkatov, A. et al. "Optical properties of human skin, subcutaneious and mucous tissues in the wavelength range from 400 to 2000 nm"; Journal of Physics D: Applied Physics, 38, 2005, pp. 2543-2555.
Bramwell, J. et al., "The Velocity of the Pulse Wave in Man", Proc. Roy. Soc. B93, 1922, pp. 298-306.
(Continued)

*Primary Examiner* — Scott M. Getzow
(74) *Attorney, Agent, or Firm* — COZEN O'CONNOR

(57) ABSTRACT

A device has a first and second PPD sensor configured for placement over an artery; a camera between the first and second PPD sensors; and a processor having memory with firmware for determining pulse transit time (PTT) between the PPD sensors, and determines blood pressure (BP) therefrom using a calibrated conversion from PTT to BP. The firmware also obtains initial and subsequent images of the artery, extracts features, and adjusts calibrated conversion from PTT to BP based upon features extracted from the initial and subsequent images of the artery. In embodiments the processor enhances the initial and subsequent images of the artery using a structured light tomographic enhancement process. A method uses first and second PPD sensors placed over an artery to determine pulse transit time; obtains initial and subsequent images of the artery with a camera; and uses features extracted from the initial and subsequent images of the artery to adjust a calibrated conversion from PTT to BP.

21 Claims, 4 Drawing Sheets

(56) References Cited

PUBLICATIONS

Cohen, Z. et al., "Optical-Based Sensor Prototype for Continuous Monitoring of the Blood Pressure" IEEE Sensors Journal, 2017, 12 pages.

Fiala, J. et al., "An implantable optical blood pressure sensor based on pulse transit time", Biomed Microdevices, vol. 15, 2013, pp. 73-81.

Hasanzadeh, N. et al., "Blood Pressure Estimation Using Photoplethysmogram Signal and Its Morphological Features", IEEE Sensors Journal, vol. 20(8), 2019, 11 pages.

Islam, M. et al., "Development of a Noninvasive Continuous Blood Pressure Measurement and Monitoring System", IEEE/OSA/IAPR International Conference on Informatics, Electronics and Vision, 2012, pp. 1085-1090.

Kao, Y.-H et al., "Towards maximizing the sensing accuracy of an cuffless, optical blood pressure sensor using a high-order front-end filter", Micorsystem Technologies, vol. 24, 2018, pp. 4621-4630.

Katsuura, T. et al., "Wearable Pulse Wave Velocity Sensor using Flexible Piezoelectric Film Array". IEEE Biomedical Circuits and Systems Conference (BioCAS), 2017, 5 pages.

Li, L. et al., "Continuous and Accurate Blood Pressure Monitoring Based on Wearable Optical Fiber Wristband", IEEE Sensors Journal, vol. 21(3), Feb. 1, 2021, pp. 3049-3057.

Ma, Y. et al., "Relation between blood pressure and pulse wave velocity for human arteries", Proceedings of the National Academy of Science, vol. 115(44), 2018, pp. 11144-11149.

Mccombie, D. et al., "Adaptive hydrostatic blood pressure calbration: Development of a wearable, autonomous pulse wave velocity blood pressure monitor" Proceeings of the 29th Annual International Conference of the IEEE EMBS, Lyon, France, pp. 370-373.

Reddy, A. et al., "Noninvasive Blood Pressure Measurement in Mice Using Pulsed Doppler Ultrasound", Ultrasound in Med. & Bio., vol. 29(3), 2003, pp. 379-385.

Sola, J. et al., "Measuring Pressure", IEEE Pulse, Sep./Oct. 2018, pp. 31-33.

Sola, J. et al., "Aktiia Bracelet: Monitoring of Blood Pressue using Off-the-shelf Optical Sensors" 2019 41st Annual International Conference of the IEEE EMBC, 1 page.

Stojanova, A. et al., "Continuous Blood Pressure Monitoring as a Basis for Ambient Assisted Living (AAL)—Review of Methodologies and Devices", Journal of Medical Systems, vol. 43(24), 2019, 12 pages.

Thomas, J. G., "A method for continuously indicating blood pressure.", Proceedings of the Physiological. vol. 129(3), 1955, pp. 75-76.

Watanabe, N. et al., Development and Validation of a Novel Cuff-Less Blood Pressure Monitoring Device:, Journal of the American College of Cardiology: Basic to Translational Science, vol. 2(6), 2017, pp. 631-642.

Zhang, G. et al., "Hybrid Optical Unobtrusive Blood Pressure Measurements" Sensors, vol. 17, Jul. 1, 2017, 15 pages.

Zheng, D., "A Ring-type Device for the Noninvasive Measurement of Artierial Blood Pressure", Proceedings of the 25th Annual International Conference of the IEEE EMBS, Cancun Mexico, 2003, pp. 3184-3187.

BLOOD PRESSURE MONITORING UTILIZING PRESSURE WAVE VELOCITY AND CALIBRATION CORRECTION WITH NEAR INFRARED IMAGING

Many existing methods of blood pressure (BP) monitoring, such as sphygmomanometers with automatic or manual sound monitoring for Korotkoff sounds, require bulky apparatus, and interfere with normal daily activities. To improve patient compliance and obtain better blood pressure records over time, there is need for small, wearable, devices that can monitor blood pressure without interference with normal activities and do not require implantation.

Some alternative methods have been considered for ambulatory BP measurement, as described in Stojanova, A. (2019). *Continuous Blood Pressure Monitoring as a Basis for Ambient Assisted Living (AAL)*, Journal of Med. Syst. 43(24), 1-12. Of note, many of these methods involve measuring the Pulse Wave Velocity (PWV) of blood flowing through the body's arteries, as described in Katsuura, T. (2017), *Wearable Pulse Wave Velocity Sensor using Flexible Piezoelectric Film Array*, IEEE Biomedical Circuits and Systems (BioCAS) (pp. 1-4). The PWV is the speed of the pressure pulse that emanates from the heart (not the speed of the blood flow). This pressure pulse that can be measured at different points on the body, such as at the radial artery on the wrist, to obtain the heart rate (HR). The travel time between different points along an artery path is the pulse transit time (PTT) and represents the PWV. The PWV has a strong relationship to the mean blood pressure (MBP) and/or the systolic (maximum) blood pressure. As the MBP increases, the PWV increases (PTT decreases) because the artery walls are in a "stiffer" state. This functional relationship follows validated mechanical models. As an example of this correlation, FIG. 1 shows a plot of the BP vs. PTT from Fiala, J. (2013), *An implantable optical blood pressure sensor based on pulse transit time*, Biomed. Microdevices 15, 73-81.

A common approach to measuring PWV is to monitor a specific feature of an electrocardiogram signal and perform a photoplethysmogram (PPG) at an appropriate location of the body distal from the heart. An ECG signal emanates from the heart as it beats while the PPG is an optical signal obtained by measuring the reflection or absorption of light, either visible or near infrared (NIR), in the vicinity of a distal artery. These signals have been measured either at the radial artery near the wrist, or at an artery along a finger(digital). It is assumed that the specific feature of the ECG signal represents the start time of a blood pressure wave, and a specific feature of the PPG signal occurs when the pulse reaches the location of the device. The difference in time between the ECG and PPG is interpreted as PTT and is assumed to be inversely proportional to the PWV.

While PWV correlates with BP, prior reported experiments found that frequent recalibration of BP derivation from PWV is required for each patient because the correlation between PWV and BP drifts over timeframes of weeks to months.

SUMMARY

In an embodiment, a device designated A including a first photoplethysmographic device (PPD) sensor configured for placement over an artery; a second PPD sensor configured for placement over the artery; at least one camera disposed between the first and second PPD sensors; and a processor having memory containing firmware. The processor is configured by firmware to determine pulse transit time (PTT) from the first PPD sensor to the second PPD sensor, and to determine blood pressure (BP) therefrom using a calibrated conversion from PTT to BP; and to obtain initial and subsequent images of the artery, to extract features therefrom, and to adjust the calibrated conversion from PTT to BP based upon features extracted from the initial and subsequent images of the artery. In particular embodiments the processor is configured to enhance the initial and subsequent images of the artery using a structured light tomographic enhancement method.

In another embodiment, a method includes using a first and a second photoplethysmographic (PPD) sensor configured for placement over an artery to determine pulse transit time from the first PPD sensor to the second PPD sensor; obtaining initial and subsequent images of the artery with at least one camera disposed over the artery between the PPD sensors; using a processor having memory containing firmware, using a calibrated conversion from PTT to BP; and using features extracted from the initial and subsequent images of the artery to adjust the calibrated conversion from PTT to BP.

DETAILED DESCRIPTION OF THE EMBODIMENTS

The drift of BP derivation from PWV is due, at least in part, to changes that occur over time to the artery and change the calibration of sensors used in the PWV method. Improving calibration can render the PWV method more stable over time.

Changes in the mechanical properties of the artery along the length which the measured pulse travels can cause this drift. Stretching of the artery, deposits on the artery wall, changes in the artery diameter or changes in the general blood flow pattern along any branches are some changes that may occur in arteries over time.

To compensate for this drifting of the calibration a camera is used to periodically capture images of the artery using near-infrared optical imaging and use these images to correct for any structural or mechanical changes which could affect the PWV.

Figure 1:
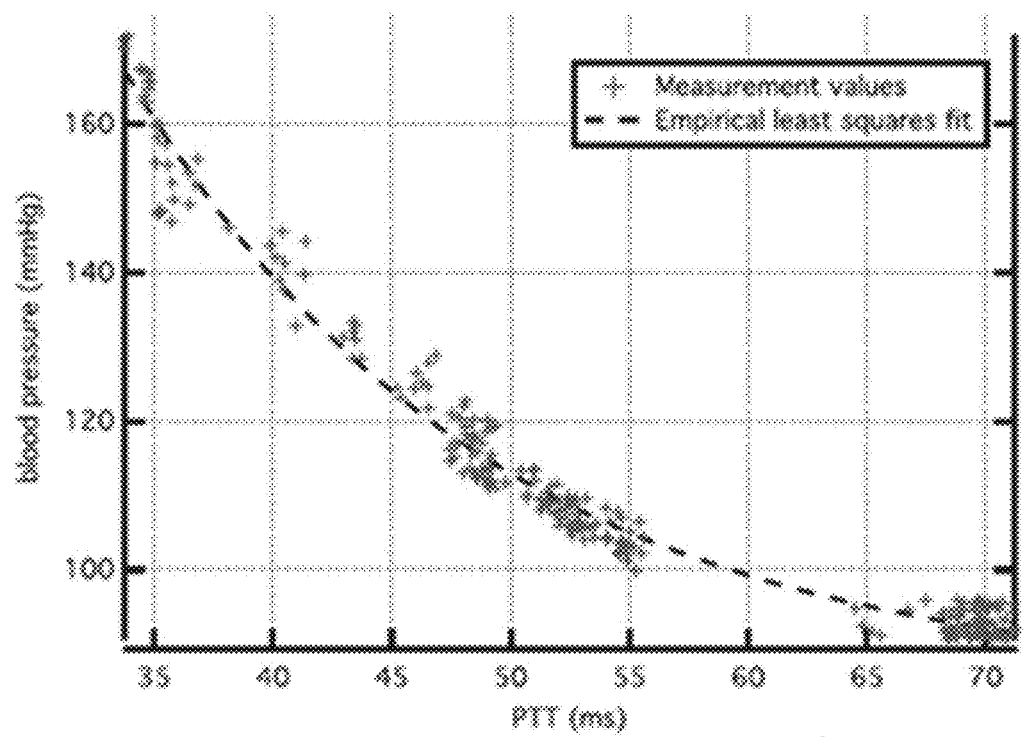
FIG. 1 is a PRIOR ART plot of measured blood pressure versus pulse transit time from J. Fiala (Fiala, 2013).
Figure 2:
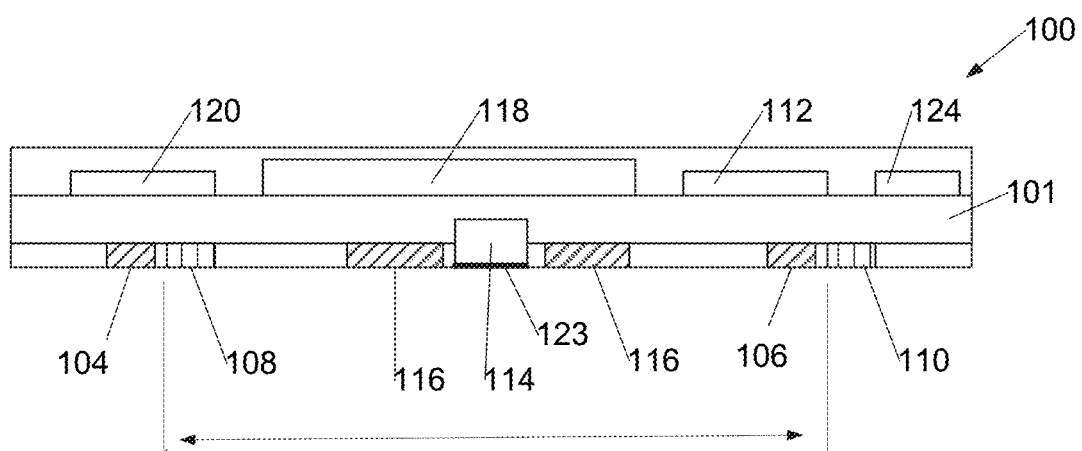
FIG. 2 is a cross sectional view of an embodiment of a device for measuring pulse-wave velocity of blood in an artery and deriving blood pressure therefrom.
Figure 5:
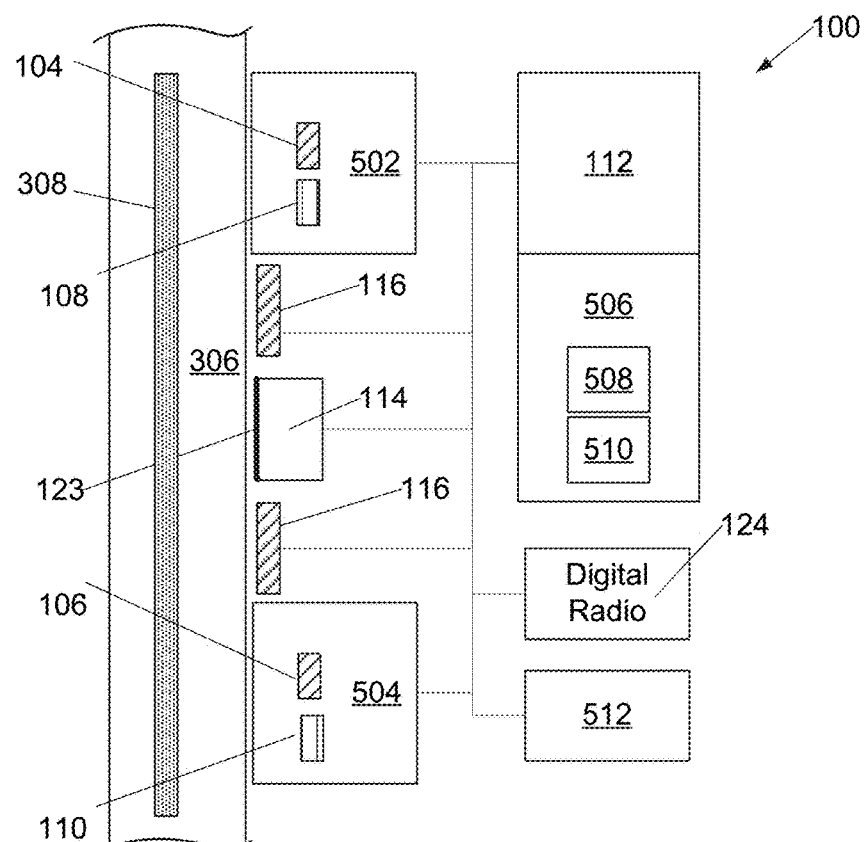
FIG. 5 is a block diagram of a device of FIG. 2, in an embodiment.

A basic implementation of a BP sensing device 100 is illustrated in FIGS. 2 and 5. As shown, the PWV is measured along a short, known length 102 of an artery 308, (not shown in FIG. 2 for simplicity) determined by locations of LEDs 104, 106 and photodiodes (PD) 108, 110. This length 102 can be several millimeters to several centimeters, in some embodiments between 5 millimeters and 1.5 centimeters, and in a particular embodiment is one centimeter. LED 104 and PD 108 form a first photoplethysmographic sensor 502 and LED 106 and photodiode 110 form a second photoplethysmographic sensor 504, the length 102 corresponds to a spacing between the first and second photoplethysmographic sensors. At each end of this length, a light-emitting diode (LED) 104, 106 is used to illuminate adjacent locations on an artery for measurement of the PPG signals. The two PPG signals are measured with photodiodes 108, 110. Each pairing of LED 104 with PD 108 and LED 106 with PD 110 has the same geometry to generate signals that are as similar as possible and only differ in the transit time of the pulse wave. The LEDs 104, 106 operate under control of a processor 112, and PDs 108, 110 provide PPG signals to processor 112. LEDs 104, 106, PDs 108, 110, processor 112, and other components of the device are mounted to a printed-circuit substrate 101. In a particular embodiment LEDs 104, 106 are monochromatic, which is sufficient to monitor changes in artery diameter as pulse waves reach the artery. In alternative embodiments each LED 104, 106 is a pair of pulsed LEDs of different wavelengths permitting recording of differences in light absorbance at two wavelengths from which blood oxygenation levels can be determined.

Processor 112 has memory 506 containing firmware 508 and at times contains calibrated PWV or PPT to BP conversion tables 510.

The PPG signals are compared and similar features in the signals are used to mark their time. For example, the steepest point of rise (maximum derivative vs. time) may be used to mark the time for each PPG signal. The pulse transit time PTT determined by device 100 is the difference in time between the marks. Note that the PWV speed is known to be in a range of 3 m/s to 20 m/s (Ma, 2018), at a distance of millimeters (mm) to centimeters (cm) the PPT is in the range of approx. 10-5 sec. to 10-1 sec.

Because these PPG signals are measured along a small, known length of an artery, any change in the relationship of PWV and PPT to BP would be due to the mechanical/structural changes that would occur along this length. A CMOS camera 114 is located between these two PPG locations to monitor the artery; light for imaging is provided by arrays of LEDs 116 operable under control of processor 112. CMOS camera 114 provides images to processor 112. Based on the optical properties of the subcutaneous human tissue, the images are best formed in the near infrared (NIR) range of light (700 nm to 1500 nm) because light at these wavelengths successfully penetrates tissue, including human tissue, well. In this spectral range it is possible to penetrate over a centimeter below the surface of the skin, and with the right choice of optics and image enhancement, form an image of an artery despite considerable scattering of the light in this range.

Also provided in device 100 are a battery 118 coupled to power the processor 112, camera 114, other components of device 100. Also provided are an inductive battery charger 120 permitting recharge of battery 118 when exposed to an electromagnetic field provided by an external charging device (not shown), and a digital radio 124 through with processor 112 may transmit PTT, PWV, and/or derived BP readings to an external network device.

In an exemplary imaging of an artery, an Omni Vision image sensor (OVT6211) CMOS camera was in close proximity to the skin above the radial artery near the wrist. Images were obtained of the artery under 940 nanometer (nm) near-infrared illumination.

In embodiments, CMOS camera 114 is equipped with an infrared filter 123 having a passband that passes light of a wavelength provided by light-emitting diode arrays 116 while blocking light of shorter wavelengths to reduce interference from light scattered through tissue from room lighting. Processor 112 is coupled to a digital radio 124. In an embodiment, digital radio 124 is compatible with the Bluetooth standard and may communicate with a cellular telephone (not shown) or another network-coupled device. In alternative embodiments, digital radio 124 is compatible with other short-range digital radio networks commonly used for body-area networks such as MedRadio, Zigbee and capable of interfacing with other processor-equipped nodes. In some embodiments, the device also has a small display 512 that can display calculated blood pressure to a user.

Figure 3:
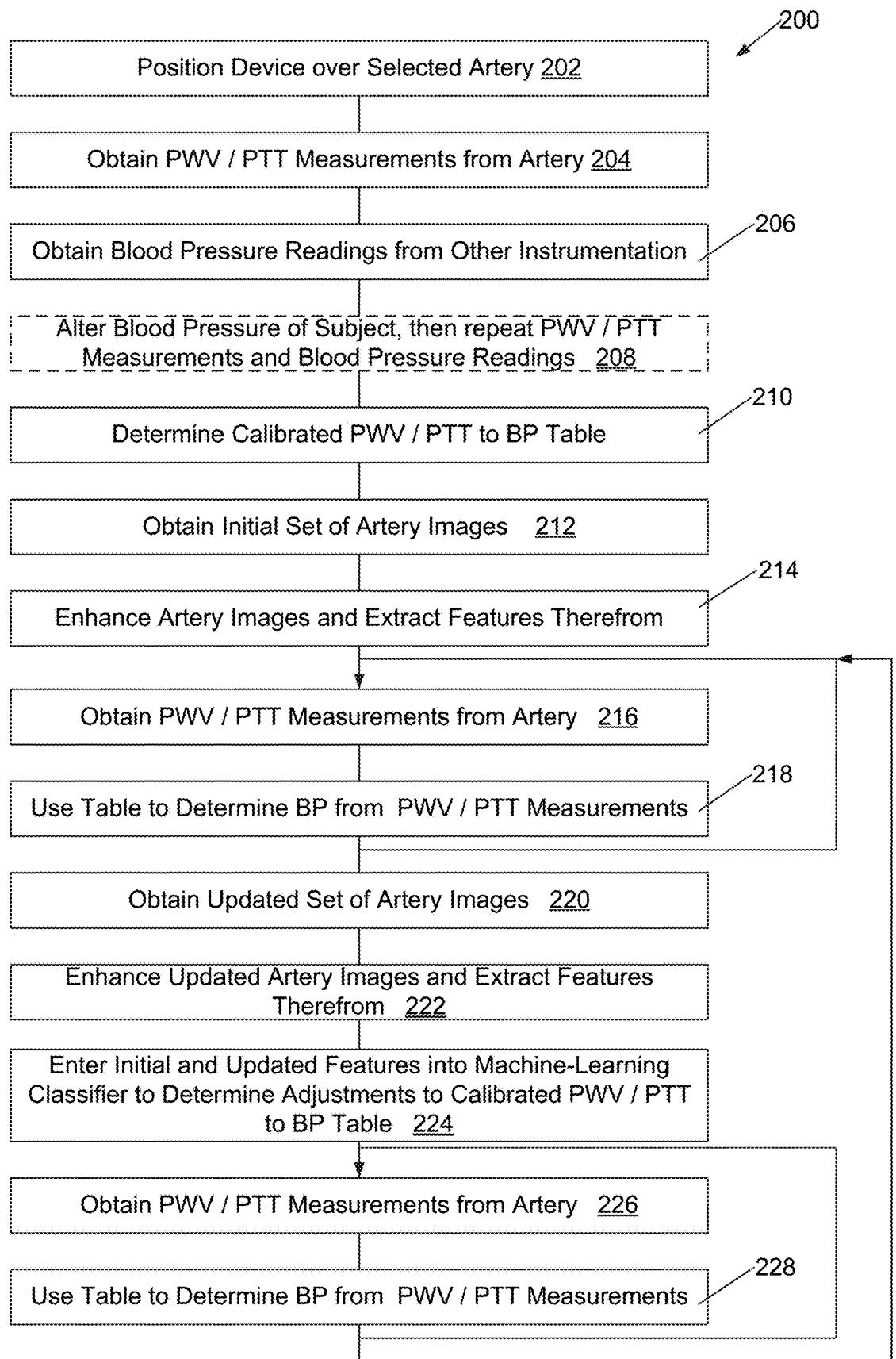
FIG. 3 is a flowchart of operation of the device of FIG. 2.

FIG. 3 is a flowchart illustrating a method 200 for using device 100.

Figure 4:
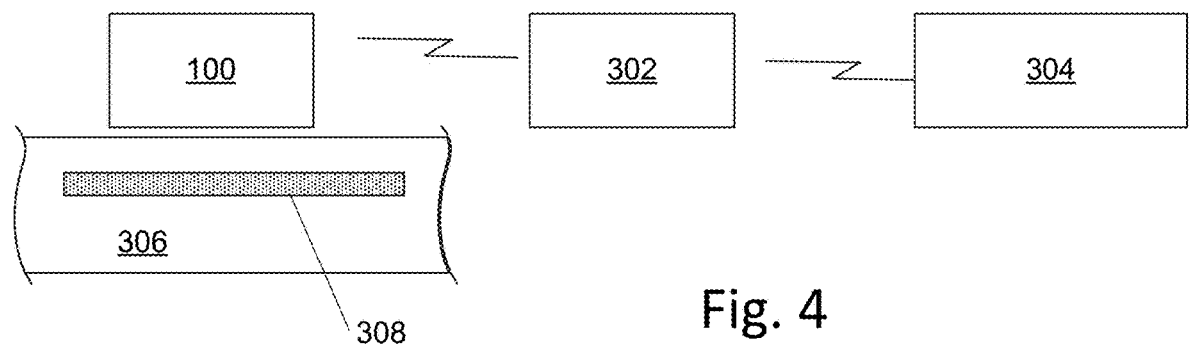
FIG. 4 is a block diagram of a system incorporating the device of FIG. 2 showing the device positioned over an artery.

In step 202, device 100 is positioned on skin over a selected artery 308 (FIG. 4) of a subject. In an example of step 202, device 100 has a self-stick glue for attachment to the subject, in other embodiments the device is strapped to the subject over the selected artery. In a particular embodiment, device 100 embedded into a ventral surface of a watchband bearing a smartwatch on a posterior surface and worn by the subject over a radial artery of the subject. The device may be removed from time to time and replaced over the same artery as necessary for bathing, swimming, and other normal activities of the subject.

In step 204, an initial set of PWV or PTT measurements are obtained. In an example of step 204, measurements are obtained by illuminating artery 308 with LEDs 104, 106, observing pulse-related changes in light received by PDs 108, 110, and measuring differences in time between pulse-related changes in light received by first PD 108 and second PD 110. In embodiments, the light provided by LEDs 104, 106 is infrared to enhance deep-tissue penetration over shorter wavelengths of light.

In step 206, an initial calibrated BP measurement is obtained as close in time as practical to the initial set of PWV or PTT measurements. In an example of step 206, a calibrated BP measurement is obtained with other instrumentation such as a blood pressure measurement system using a sphygmomanometer with sound monitoring for Korotkoff sounds.

In optional step 208, calibration of a BP measurement may include two or more sets of measurements. In this case, the blood pressure of the subject is altered 208, in an embodiment by asking a recumbent subject to stand or undertake mild exercise, and one or more additional sets of PWV or PTT measurements obtained with corresponding BP readings obtained with other instrumentation.

In step 210, the measurements obtained in steps 204, 206 and optionally 208 are used to determine a calibrated conversion table 510 or determine parameters for a PTT to BP conversion table. In an example of step 210, a calibrated PWV or PTT to BP conversion table 510 or function is created 210 and stored in device 100.

Close to the time of the initial PWV or PTT measurements being obtained 204, an initial set of images of the artery are obtained 212. This initial set of images are enhanced 214 and features are extracted from the enhanced images.

In embodiments, images of the artery are enhanced to provide higher quality images of the artery. In a particular embodiment, image enhancement of images of the artery is performed by a structured-light tomographic method. In this structured light tomographic method, light emitting diode arrays 116, operating under control of processor 112 as configured by firmware 508, provide a sequence of patterns of light comprising light and dark bars or spots in a sequence of phases to skin surface and camera 114 obtains a sequence of images of the artery as illuminated with each pattern of the sequence. Each phase represents a shifting of a pattern relative to the artery to view that artery with a different illumination than other phases of the same pattern. A voxel-based model of tissue under the device—including the artery—is constructed with absorbance and scattering parameters for each voxel, this voxel-based model is simulated as illuminated with each pattern and phase of illumination used in obtaining the sequence of images. The absorbance and scattering parameters of the voxel-based model are then fit to the sequence of images of the artery. The fit absorbance and scattering parameters of the voxel-based model become effectively enhanced, tomographic, images of the artery. The artery is identified in the absorbance and scattering parameters of the fit voxel-based model and features extracted for determining adjustments to blood pressure versus PTT measurements.

In some embodiments, images of the artery are enhanced 214 and features extracted, 222 on processor 112, in other embodiments the images of the artery 308 (FIG. 4) embedded in tissue 306 are transmitted over digital radio 124 to a cellular telephone or other processor-equipped device 302 where they may be enhanced 214, 222 and features extracted, or even uploaded through that other processor-equipped device and either Wi-Fi or cellular telephone network connections to the internet to a server 304 for enhancement; if enhanced on other processor-equipped device 302 or server 304 the extracted features are in some embodiments downloaded to device 100 for storage in memory associated with processor 112 and future use.

During normal operation, periodically PWV or PTT measurements are obtained 216 and the calibrated PWV or PTT to BP conversion table 510 or function used 218 to determine blood pressure of the subject. In embodiments, this blood pressure is recorded and transmitted over digital radio 124 and compared to limits, if outside predetermined limits an alarm may be generated. Also, during normal operation, inductive battery charger 120 may be placed within an alternating electromagnetic field to recharge battery 118.

The calibration between the BP value obtained by device 100 may drift from the BP value obtainable using other instrumentation as described in step 206. This drift may have occurred after a period of time such as a week or a few months. A readjustment procedure is periodically performed on the PWV or PTT to BP table or function. This readjustment procedure is done by obtaining 220 an updated set of images of the artery, enhancing 222 and extracting features from those images, and entering 224 both the initial and updated features into a previously trained machine-learning-based classifier to determine adjustments to the calibrated PWV or PTT to BP conversion table. In a particular embodiment this machine-learning-based classifier is a neural network-based classifier, in another embodiment it is a K-nearest-neighbors (KNN) classifier, in another embodiment it is a support vector machines (SVM) type classifier, in yet another embodiment is another type of classifier.

As herein described, images of the artery obtained using camera 114 located between the PPG measurement LED and photodiode pairs 104-108, 106-110 are used to monitor the structural properties of artery 308 embedded in tissue 306, and any changes observed are used to adjust calibration tables used for BP measurement.

In embodiments, the artery used is chosen to lie within two centimeters of skin surface and having simple geometry with minimal or no branching in between measurement LED and photodiode pairs. In a particular embodiment, artery chosen is the radial artery near the wrist.

In an alternative embodiment, the LEDs 104, 106 used for PWV or PTT measurements are part of LED arrays 116 used to image the artery.

In an alternative embodiment, camera 114 is replaced by two or more cameras to provide images showing a greater length of artery than practical with a single camera 114, or for providing images of the artery from multiple angles.

In an alternative embodiment, each photodiode of photodiodes 108, 110 is replaced by a camera and separate camera 114 is deleted. In this embodiment, the cameras that replace the photodiodes serve both to determine PWV or PTT measurements and to obtain images of the artery for monitoring properties of the artery and adjusting calibration tables.

In another alternative embodiment, one photodiode 108 of photodiodes 108, 110 is replaced by a camera that can both image the artery and sense pulse arrival serving as an optical device for sensing PWV or PTT. The second photodiode 110 of photodiodes 108, 110 is retained and serves as the second optical device for sensing PWV or PTT. In this embodiment, separate camera 114 is deleted.

Figure 6:
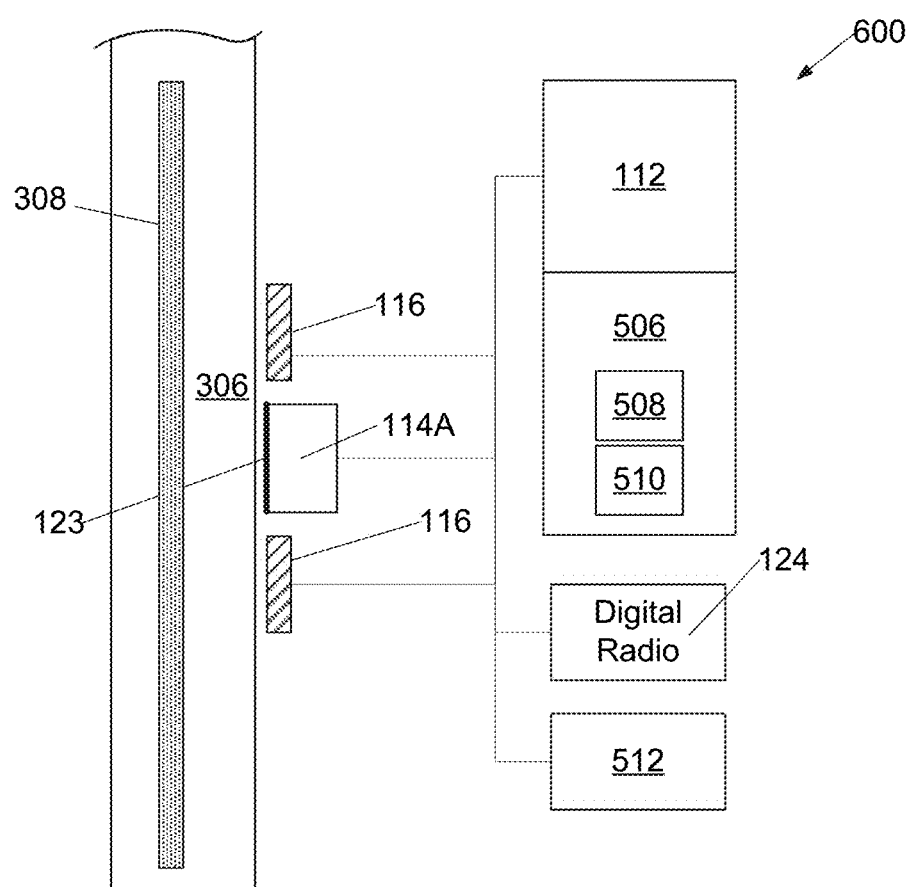
FIG. 6 is a block diagram of an alternative embodiment of the device having a single camera that serves to both observe pulse wave velocity in the artery and image the artery to determine changes in the artery with time.

In yet another alternative embodiment 600 (FIG. 6), photodiodes 108, 110 are deleted and a single camera 114A is retained. In this embodiment, camera 114A is a wide-angle camera that is positioned to observe pulse wave velocity (PWV) in the artery by observing a wave of distension along multiple millimeters of the artery in a series of images of the artery taken as the pulse wave arrives. The same camera 114A is also used to image the artery to determine changes in the artery with time, including changes in estimated depth of the artery.

In the single camera, no photodiode, embodiment 600, the processor is configured to enhance the initial and subsequent images of the artery using a structured light tomographic enhancement method as previously described, and to use a readjustment procedure as previously described. The readjustment procedure is done by obtaining 212 an initial set of images of the artery when the device is placed over the artery, obtaining 220 an updated set of images of the artery, enhancing 222 and extracting features from those images, and entering 224 both the initial and updated features into a previously trained machine-learning-based classifier to determine adjustments to the calibrated PWV or PTT to BP conversion table used to translate PWV to BP during normal operation. In a particular embodiment this machine-learning-based classifier is a neural network-based classifier, in another embodiment it is a K-nearest-neighbors (KNN) classifier, in another embodiment it is a support vector machines (SVM) type classifier, in yet another embodiment is another type of trainable classifier.

COMBINATIONS OF FEATURES

Various features herein described may be combined in more than one way. Among combinations anticipated by the inventors are:

A device designated A including a first photoplethysmographic (PPD) sensor configured for placement over an artery; a second PPD sensor configured for placement over the artery; at least one camera disposed between the first and second PPD sensors; and a processor having memory containing firmware. The processor is configured by firmware to determine pulse transit time (PTT) from the first PPD sensor to the second PPD sensor, and to determine blood pressure (BP) therefrom using a calibrated conversion from PTT to BP; and to obtain initial and subsequent images of the artery, to extract features therefrom, and to adjust the calibrated conversion from PTT to BP based upon features extracted from the initial and subsequent images of the artery.

A device designated AA including the device designated A wherein the processor is configured to enhance the initial and subsequent images of the artery using a structured light tomographic enhancement method.

A device designated AB including the device designated A, AA, AF, AG, or AH wherein the processor is configured to transmit BP readings over a digital radio.

A device designated AC including the device designated A, AA, or AB where the device is configured for placement over a radial artery of a subject.

A device designated AD including the device designated A, AA, AB, or AC where a distance between the first and second PPD sensors is between 5 millimeters and 1.5 centimeters.

A device designated AE including the device designated A, AA, AB, AC, or AD where a trainable classifier is used to determine adjustments for the calibrated conversion from PTT to BP from the initial and subsequent images of the artery.

A device designated AF including the device designated A wherein the processor is configured to transmit the images of the artery over a digital radio to an external processor and to receive adjustments to the calibrated conversion from PTT to BP over the digital radio from the external processor.

A device designated AG including the device designated AF wherein the external processor is configured to enhance the images of the artery using a structured light tomographic enhancement method.

A device designated AH including the device designated AF, or AG where a trainable classifier is used by the external processor to determine adjustments for the calibrated conversion from PTT to BP from the initial and subsequent images of the artery.

A method designated B includes using a first and a second photoplethysmographic (PPD) sensor configured for placement over an artery to determine pulse transit time from the first PPD sensor to the second PPD sensor; obtaining initial and subsequent images of the artery with at least one camera disposed over the artery between the PPD sensors; using a processor having memory containing firmware, using a calibrated conversion from PTT to BP; and using features extracted from the initial and subsequent images of the artery to adjust the calibrated conversion from PTT to BP.

A method designated BA including the method designated B including enhancing the initial and subsequent images of the artery using a structured light tomographic enhancement method.

A method designated BB including the method designated B or BA including transmitting BP readings over a digital radio.

A method designated BC including the method designated B, BA, or BB where the artery is a radial artery of a subject.

A method designated BD including the method designated B, BA, BB, or BC where a distance between the first and second PPD sensors is between 5 millimeters and 1.5 centimeters and in a particular embodiment is 1 centimeter.

A method designated BE including the method designated B, BA, BB, BC, or BD where a trainable classifier is used to determine the adjustments for the calibrated conversion from PTT to BP from the initial and subsequent images of the artery.

A device designated C includes a first optical device including a camera and configured for placement over an artery; a second optical device configured for placement over the artery; and a processor having memory containing firmware. the processor configured by the firmware to determine pulse transit time (PTT) from images of the artery obtained by the first optical device and signals obtained by the second optical device, and to determine blood pressure (BP) therefrom using a calibrated conversion from PTT to BP; the processor also configured by firmware to obtain initial and subsequent images of the artery with the first optical device, to extract features therefrom, and to adjust the calibrated conversion from PTT to BP based upon features extracted from the initial and subsequent images of the artery.

A device designated CA including the device designated C wherein the processor is configured to enhance the initial and subsequent images of the artery using a structured light tomographic enhancement method.

A device designated CB including the device designated C or CA wherein the processor is configured to transmit BP readings over a digital radio.

A device designated CC including the device designated C, CA, or CB where the second optical device is a second camera.

A device designated CD including the device designated C, CA, or CB where the second optical device is a photoplethysmographic device (PPD).

A device designated D includes a camera configured for placement over an artery; a processor having memory containing firmware; the processor configured by the firmware to determine pulse wave velocity (PWV) from images of the artery obtained by the camera and to determine blood pressure (BP) therefrom using a calibrated conversion from PWV to BP. The processor is further configured by firmware to obtain initial and subsequent images of the artery from the first optical device, to extract features therefrom, and to adjust the calibrated conversion from PWV to BP based upon features extracted from the initial and subsequent images of the artery.

A device designated DA including the device designated D wherein the processor is configured to enhance the initial and subsequent images of the artery using a structured light tomographic enhancement method.

A device designated DB including the device designated D or DA wherein the processor is configured to transmit BP readings over a digital radio.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A device comprising:
   a first photoplethysmograpic (PPD) sensor configured for placement over an artery;
   a second PPD sensor configured for placement over the artery;
   at least one camera disposed between the first and second PPD sensors; and
   a processor having memory containing firmware;
   the processor configured by firmware to determine pulse transit time (PTT) from the first PPD sensor to the second PPD sensor, and to determine blood pressure (BP) therefrom using a calibrated conversion from PTT to BP;

the processor further configured by firmware to obtain initial and subsequent images of the artery, to extract features therefrom, and to adjust the calibrated conversion from PTT to BP based upon features extracted from the initial and subsequent images of the artery.

2. The device of claim 1 wherein the processor is configured to enhance the initial and subsequent images of the artery using a structured light tomographic enhancement method.

3. The device of claim 2 where a trainable classifier is used to determine adjustments for the calibrated conversion from PTT to BP from the initial and subsequent images of the artery.

4. The device of claim 3 wherein the processor is configured to transmit BP readings over a digital radio.

5. The device of claim 3 where the device is configured for placement over a radial artery of a subject.

6. The device of claim 5 where a distance between the first and second PPD sensors is between five millimeters and one-and-a-half centimeters.

7. The device of claim 1 wherein the processor is configured to transmit the images of the artery over a digital radio to an external processor and to receive adjustments to the calibrated conversion from PTT to BP over the digital radio from the external processor.

8. The device of claim 7 wherein the external processor is configured to enhance the images of the artery using a structured light tomographic enhancement method.

9. The device of claim 8 where a trainable classifier is used by the external processor to determine adjustments for the calibrated conversion from PTT to BP from the initial and subsequent images of the artery.

10. The device of claim 9 where the device is configured for placement over a radial artery of a subject.

11. The device of claim 9 where a distance between the first and second PPD sensors is between 5 millimeters and 1.5 centimeters.

12. A method comprising:
using a first and a second photoplethysmograpic (PPD) sensor configured for placement over an artery to determine pulse transit time from the first PPD sensor to the second PPD sensor;
obtaining initial and subsequent images of the artery with at least one camera disposed over the artery between the PPD sensors;
using a processor having memory containing firmware, and using a calibrated conversion from PTT to BP; and
using features extracted from the initial and subsequent images of the artery to adjust the calibrated conversion from PTT to BP.

13. The method of claim 12 further comprising enhancing the initial and subsequent images of the artery using a structured light tomographic enhancement method.

14. The method of claim 12 where a trainable classifier is used to determine the adjustments for the calibrated conversion from PTT to BP from the initial and subsequent images of the artery.

15. The method of claim 14 further comprising transmitting BP readings over a digital radio.

16. The method of claim 14 where the artery is a radial artery of a subject.

17. The method of claim 14 where a distance between the first and second PPD sensors is one centimeter.

18. A device comprising:
a first optical device comprising a camera configured for placement over an artery;
a second optical device configured for placement over the artery, the second optical device selected from a photoplethysmographic sensor and a camera; and
a processor having memory containing firmware;
the processor configured by firmware to determine pulse transit time (PTT) from images of the artery obtained by the first optical device and pulse arrival signals obtained by the second optical device, and to determine blood pressure (BP) therefrom using a calibrated conversion from PTT to BP;
the processor further configured by firmware to obtain initial and subsequent images of the artery from the first optical device, to extract features therefrom, and to adjust the calibrated conversion from PTT to BP based upon features extracted from the initial and subsequent images of the artery.

19. The device of claim 18 wherein the processor is configured to enhance the initial and subsequent images of the artery using a structured light tomographic enhancement method.

20. The device of claim 19 wherein the processor is configured to transmit BP readings over a digital radio.

21. A device comprising:
a camera configured for placement over an artery;
a processor having memory containing firmware;
the processor configured by firmware to determine pulse wave velocity (PWV) from images of the artery obtained by the camera and to determine blood pressure (BP) therefrom using a calibrated conversion from PWV to BP;
the processor further configured by firmware to obtain initial and subsequent images of the artery from the camera, to extract features therefrom, and to adjust the calibrated conversion from PWV to BP based upon features extracted from the initial and subsequent images of the artery.

* * * * *